(12) United States Patent
Myer et al.

(10) Patent No.: US 12,436,008 B2
(45) Date of Patent: Oct. 7, 2025

(54) SYSTEM AND APPARATUS FOR SENSOR CALIBRATION

(71) Applicant: Robert Bosch GmbH, Stuttgart (DE)

(72) Inventors: Weston Myer, Minneapolis, MN (US); Scott Bartkowiak, Novi, MI (US)

(73) Assignees: Bosch Automotive Service Solutions, Inc., Warren, MI (US); Robert Bosch GmbH, Stuttgart (DE)

( * ) Notice: Subject to any disclaimer, the term of this patent is extended or adjusted under 35 U.S.C. 154(b) by 143 days.

(21) Appl. No.: 17/987,389

(22) Filed: Nov. 15, 2022

(65) Prior Publication Data

US 2024/0159577 A1    May 16, 2024

(51) Int. Cl.
*G01D 21/00*        (2006.01)
*G01C 9/02*         (2006.01)

(52) U.S. Cl.
CPC .............. *G01D 21/00* (2013.01); *G01C 9/02* (2013.01)

(58) Field of Classification Search
CPC ................................. G01C 9/02; G01D 21/00
USPC ........................................................ 73/1.01
See application file for complete search history.

(56) References Cited

U.S. PATENT DOCUMENTS

2019/0187249 A1* 6/2019 Harmer .................... G01S 7/40
2020/0141724 A1* 5/2020 Lawrence ............ G01B 11/272

* cited by examiner

*Primary Examiner* — Nathaniel T Woodward
(74) *Attorney, Agent, or Firm* — David Kovacek (57) ABSTRACT

An apparatus for calibrating vehicle sensors comprising a mat and at least one target assembly. The mat is placed in a specified location in relation to a vehicle subject to a calibration process, and the target assembly is placed in relation to the mat. The target assembly comprises adjustable components to control the vertical placement, roll, and pitch of the target with respect to the vehicle.

13 Claims, 7 Drawing Sheets

SYSTEM AND APPARATUS FOR SENSOR CALIBRATION

TECHNICAL FIELD

This disclosure relates to the calibration of vehicular sensor, and in particular sensors utilized in an advanced driver assistance system.

BACKGROUND

Advanced driver assistance (ADAS) functions of modern vehicles are becoming more robust and complex. ADAS functions of vehicles rely upon an array of sensors arranged around the vehicle to monitor the environmental and traffic conditions the vehicle is subjected to. Calibration of these sensors is critical to ensure proper and safe operation of the ADAS functions of the associated vehicle. Specialized calibration apparatuses have been utilized to provide calibration of the sensors associated with ADAS functions.

Existing calibration apparatuses are often bulky, unwieldly, and rely upon controlled environments and repeated measurements with respect to the subject vehicle to find their appropriate placement for a successful calibration. It would be desirable for a calibration apparatus that was functional with a minimized number of measurements in order to expedite the setup process and streamline calibration, even in field environments.

SUMMARY

One aspect of this disclosure is directed to a sensor calibration apparatus comprising a mat and a target assembly. The mat comprises at least a first marking thereon indicating a first specified position of the ground mat in relation to a subject vehicle during a calibration of a sensor of the subject vehicle. The target assembly comprises a base member, an upright member extending from the base member, a coupling bracket, a pitch bracket, a target, and a roll knob. The upright member extends from the base member. The coupling bracket is configured to couple to the upright member and is adjustably positionable along the length of the upright member when coupled. The pitch bracket is coupled to the coupling bracket and comprises a target mount and a hinge. The target is configured to detachably couple to the target mount. The roll knob controls the roll motion of the target when the target is coupled to the target mount. The hinge provides a degree of pitch motion to the target mount with respect to the upright member. The mat may additionally comprise a second marking thereon indicating a second specified placement of the target assembly in relation to the subject vehicle during a sensor calibration.

Another aspect of this disclosure is directed to a sensor calibration assembly comprising a base member an upright member extending from the base member, a coupling bracket coupled to the upright member, the coupling bracket adjustably positionable along the length of the upright member, a pitch bracket coupled to the coupling bracket, the pitch bracket comprising a target mount and a hinge, a target detachably coupled to the target mount, and a roll knob controlling a roll motion of the target when the target is coupled to the target mount. Wherein the hinge controls a pitch motion of the target mount with respect to the upright member.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
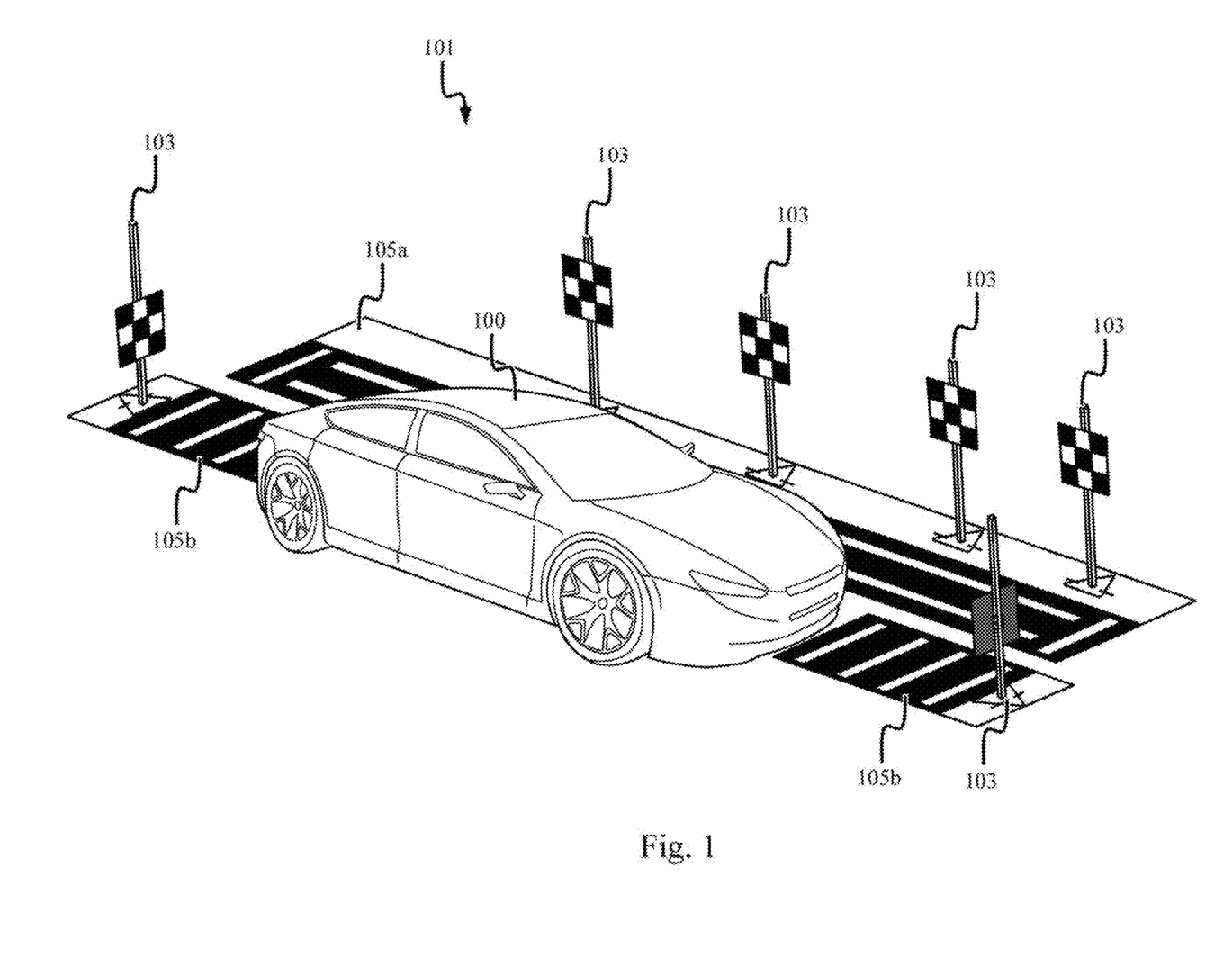
FIG. 1 is an illustration of a vehicle during a sensor calibration.

FIG. 1 shows a vehicle 100 subject to a sensor calibration process utilizing a sensor calibration apparatus 101. The sensor calibration apparatus 101 comprises a number of target assemblies 103, and a number of mats 105. During the sensor calibration process, each of the number of target assemblies 103 is placed in a specific locus in relation to vehicle 100 in order to provide a calibration target for one or more sensors of vehicle 100. The number of mats 105 provide a fast and reliable way to align the target assemblies 103 to vehicle 100 properly for the sensor calibration process. In the depicted embodiment, vehicle 100 comprises a sedan, but any other configuration for vehicle 100 may be supported without deviating from the teachings disclosed herein. Advantageously, sensor calibration apparatus 101 may be configured to accommodate a wide variety of makes and models of a vehicle in order to maximize its versatility and value in calibration processes.

Figure 2:
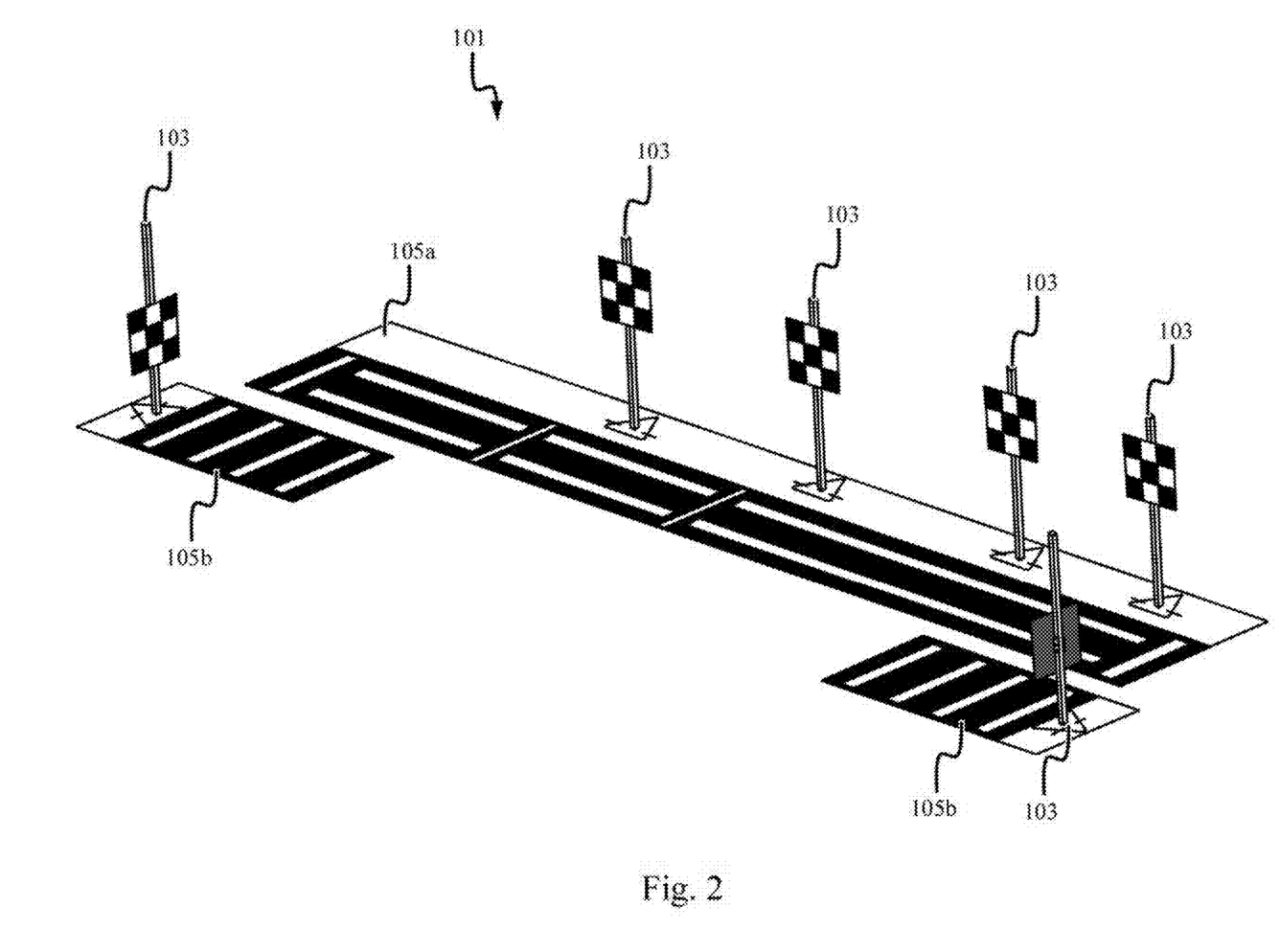
FIG. 2 is an illustration of a sensor calibration apparatus.

FIG. 2 depicts the sensor calibration apparatus 101 without the vehicle 100 to obstruct the view thereof. In the depicted embodiment, sensor calibration apparatus 101 comprises six target assemblies 103, but other embodiments may comprise other configurations without deviating from the teachings disclosed herein. Notably, according to the present invention, sensor calibration apparatus 101 is still functional with a single target assembly 103 that can be repositioned during the sensor calibration process. In the depicted embodiment, the sensor calibration apparatus 101 comprises 3 mats 105 having two distinct configurations, mat 105a and mat 105b. These configurations advantageously permit a user to quickly and reliably arrange the mats in relation to a vehicle (such as vehicle 100; see FIG. 1) in a predetermined fashion in order to ensure that that target assemblies 103 can be similarly positioned quickly and reliably for a success sensor calibration process. Other embodiments may comprise a different number or configuration of mats 105 without deviating from the teachings disclosed herein. Notably, some embodiments may utilize a single mat without deviating from the teachings disclosed herein.

Figure 3:
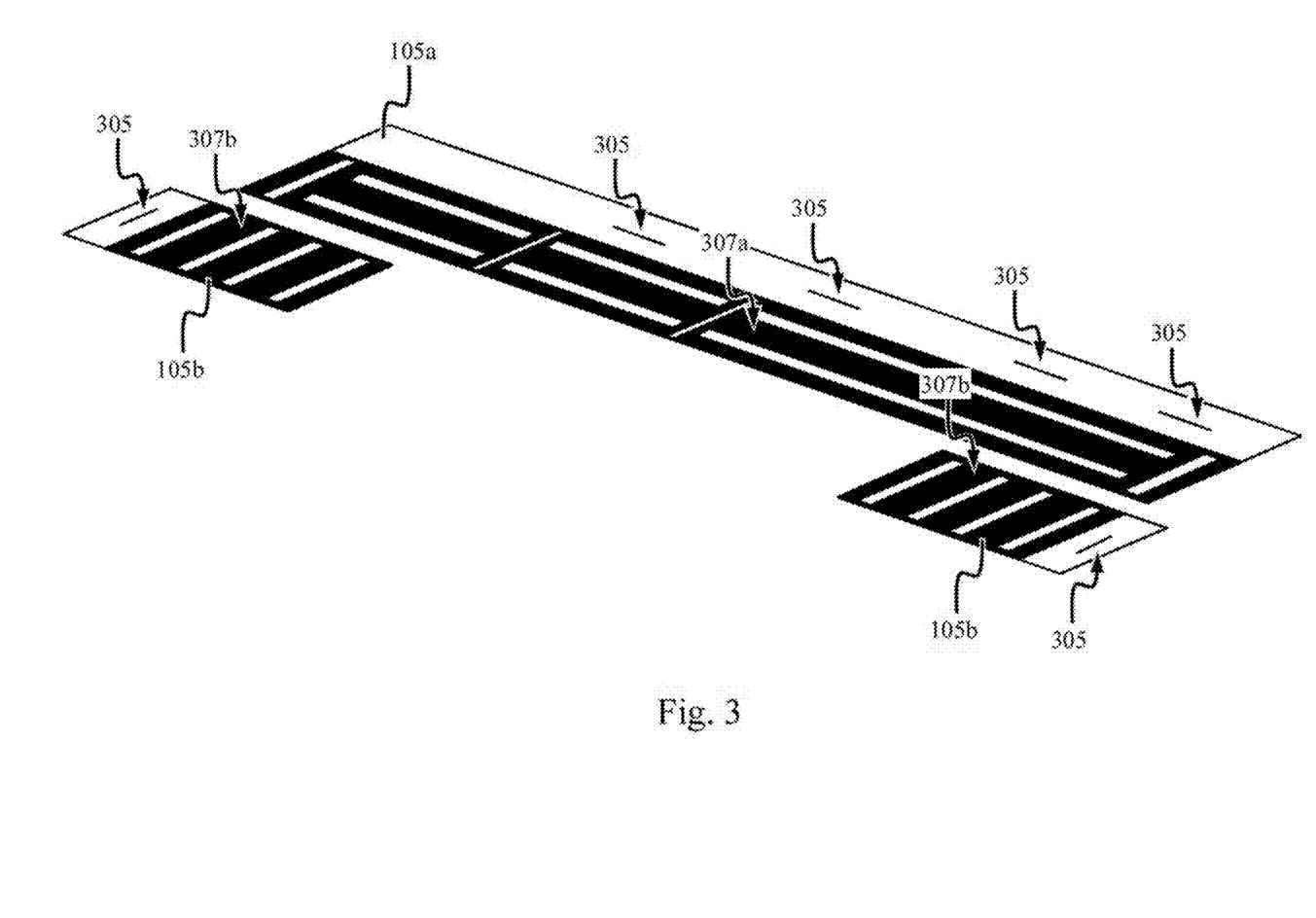
FIG. 3 is an illustration of a mat from the sensor calibration apparatus of FIG. 2.

FIG. 3 depicts mats 105 without the accompanying target assembly 103 (see FIG. 1; FIG. 2). In this depiction, it can be observed that each of mats 105 comprises a number of placement indicators 305, which provides a user with a visual reference for the placement and orientation of an associated target assembly. In the depicted embodiment, each of the number of placement indicators 305 comprises a stripe, but other embodiments may comprise additional or different configurations of placement indicators without deviating from the teachings disclosed herein. By way of example, and not limitation, other embodiments may comprise a number of placement indicators 305 having different placements and configurations in order to accommodate a broader range of vehicles or vehicle sensors. In the depicted embodiment, each of mats 105 additionally comprises a number of alignment markings 307 which are used to quickly and reliably place a respective mat 105 in relation to a vehicle subject to a sensor calibration process (such as vehicle 100; see FIG. 1). In the depicted embodiment, alignment markings 307 comprise a series of white lines on a dark background, but other embodiments may comprise other configurations without deviating from the teachings disclosed herein. By way of example, and not limitation, alignment markings 307 may comprise stripes, arrows, alphanumeric sequences, or any other symbology known to one of ordinary skill in the art without deviating from the teachings disclosed herein.

Figure 4:
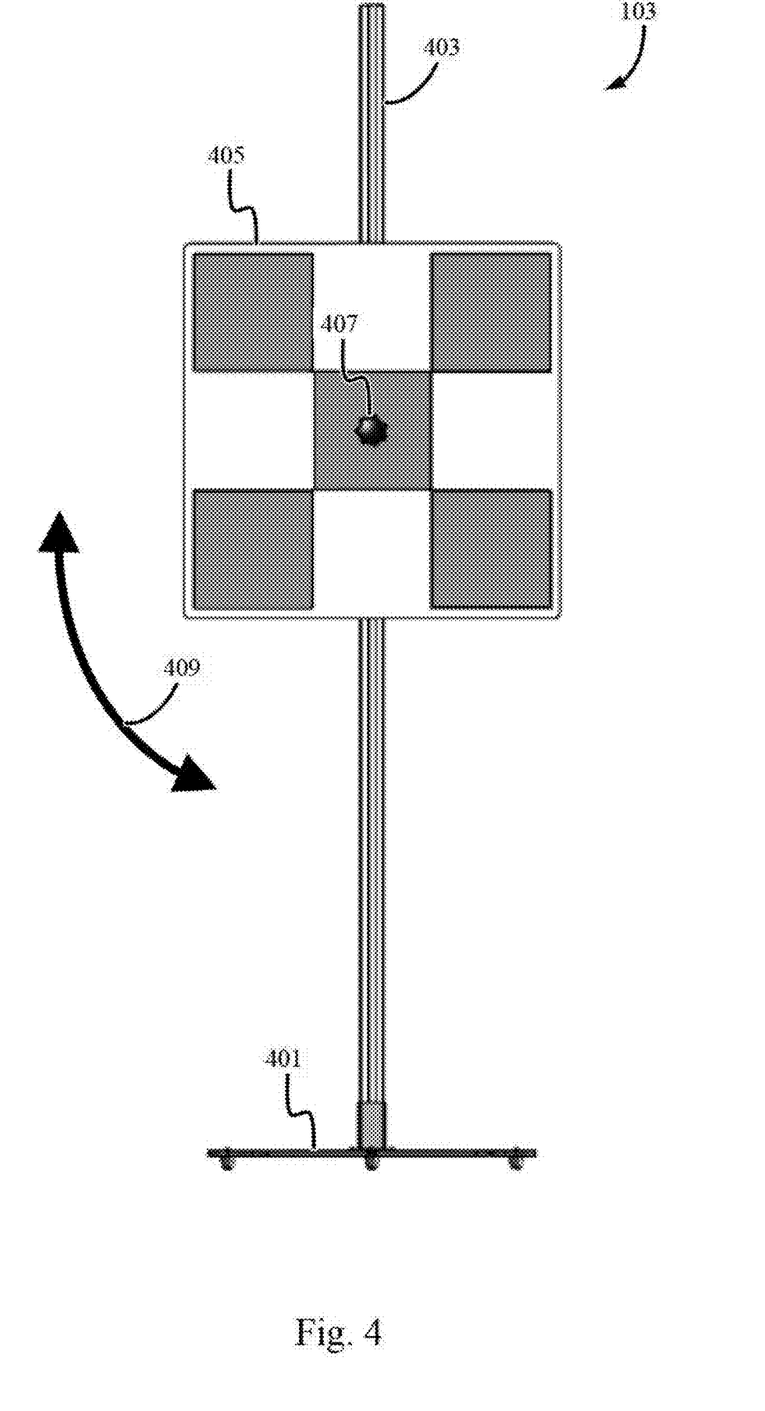
FIG. 4 is an front-view illustration of a target assembly of the sensor calibration apparatus of FIG. 2.

FIG. 4 depicts a target assembly 103 from a front-view perspective. In this perspective, it can be observed that target assembly 103 comprises a base member 401 supporting the rest of the assembly on its resting surface, such as the ground or a floor of a building. Additional features of base member 401 will be discussed later with respect to other figures. Extending from base member 401 in a direction substantially perpendicular to the resting surface is an upright member 403. Upright member 403 provides an upright support for additional elements of target assembly 103, and in particular a target 405. Target 405 is utilized during a sensor calibration process for a vehicle (such as vehicle 100; see FIG. 1). Because different makes and model of vehicle may require different target designs or configurations, target 405 is detachably coupled to the rest of target assembly 103, and may be replaced with a different embodiment of target 405 to advantageously accommodate a different make or model of vehicle, or a different configuration for a sensor thereof. In the depicted embodiment, target 405 comprises a target board having a design on one side, but other embodiments may comprise different configurations without deviating from the teachings disclosed herein. By way of example, and not limitation, other configurations may utilize a target board having multiple designs that may be presented based upon the orientation of target 405 while coupled with the rest of target assembly 103. In some embodiments, target 405 may comprise a target mat, which may advantageously be rolled or folded into a more compact arrangement to enhance portability. Target 405 may comprise a number of materials such as metal, wood, paper, vinyl, rubber, polymers, or any other material known to one of ordinary skill in the art without deviating from the teachings disclosed herein. In the depicted embodiment, target 405 presents a checkerboard pattern for use in sensor calibration, but other embodiments may present any arbitrary or specified pattern suitable to be compatible with a particular vehicle or sensor thereof without deviating from the teachings disclosed herein. Some embodiments may comprise an active display capable of active reconfiguration of the presented pattern without deviating from the teachings disclosed herein.

In the depicted embodiment, target 405 detachably couples to the rest of target assembly 103 utilizing a mounting hole (not visible) and a pin (not shown) threading the mounting hole. In the depicted embodiment, this mounting is stabilized using a roll knob 407, which advantageously can be tightened or loosened by hand for quick and reliable assembly of the target assembly 103. In an additional advantage, utilization of roll knob 407 permits a user to control the rotation of target 405 when coupled with respect to a rotational direction 409 in order to accommodate a broader variety of vehicles and sensors. In the depicted embodiment, roll knob 407 supports a 360-degree range of motion, but other embodiments may comprise other configurations without deviating from the teachings disclosed herein.

Figure 5:
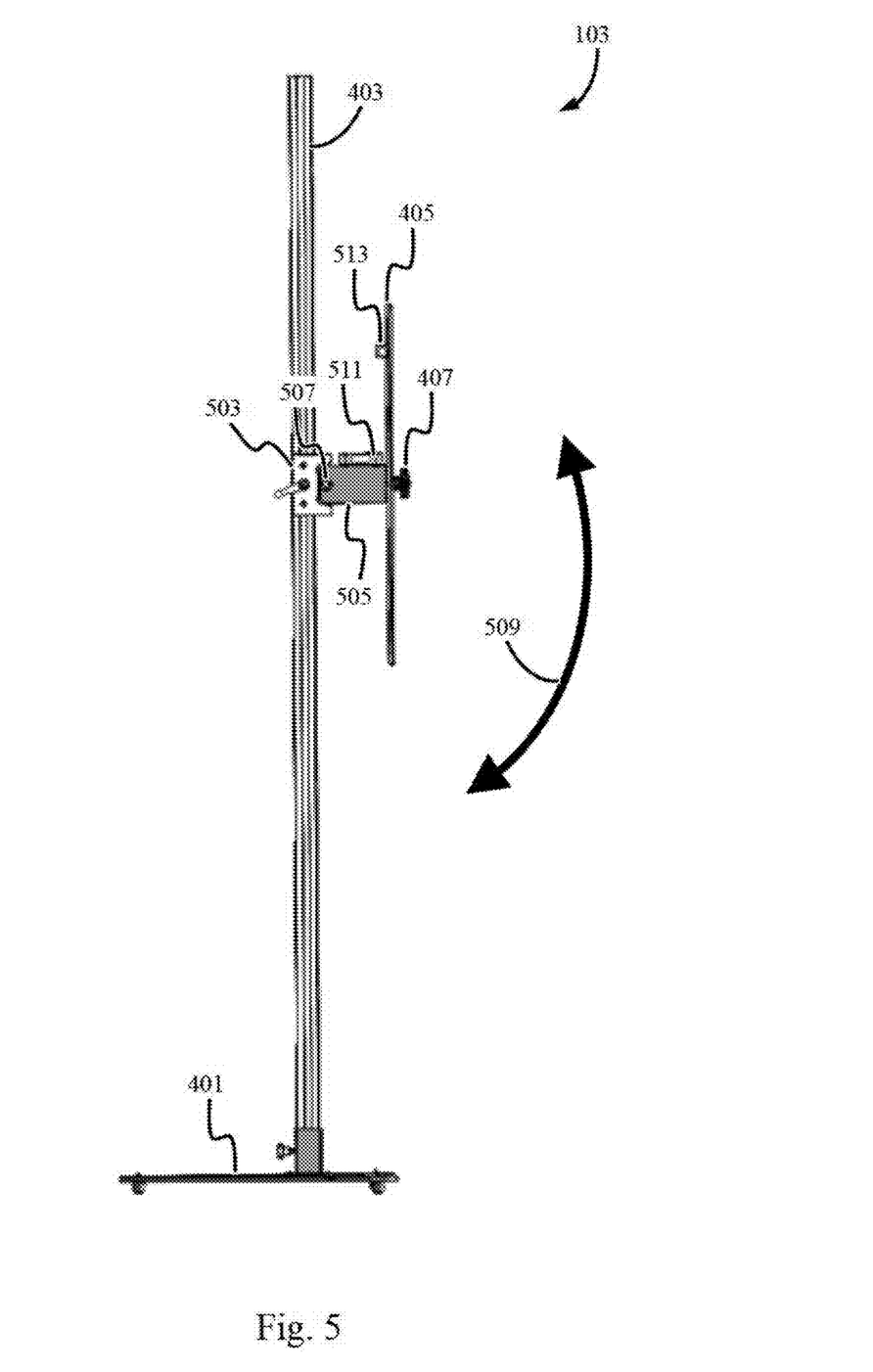
FIG. 5 is a side-view illustration of the target assembly of FIG. 4.

Additional elements of target assembly 103 can be observed from the side-view illustration depicted in FIG. 5. From this perspective, it can be seen that target 405 is coupled to upright member 403 utilizing a coupling bracket 503. Coupling bracket 503 provides the support for the rest of the elements of target assembly 103 to be coupled to upright member 403, but other features of coupling bracket 503 will be discussed later with respect to other figures. Because different environments, vehicles, and sensors may require different alignments of target 405 with respect to the subject vehicle, target 405 is coupled to coupling bracket 503 via a pitch bracket 505. Pitch bracket 505 comprises a hinge 507 that permits a pitch adjustment to target 405 with respect to rotational pitch direction 509 while coupled to upright member 403. In the depicted embodiment, pitch bracket 505 provides a range of motion of approximately 30 degrees in either direction, but other embodiments may comprise other configurations without deviating from the teachings disclosed herein.

The orientation of target 405 can be fine-tuned to a particular orientation with respect to pitch and roll. In order to measure these orientations for an accurate placement, target assembly 103 comprises a number of indicators to assist a user in quickly and reliably achieving this orientation. In the depicted embodiment, these indicators comprise a pitch indicator 511 coupled to pitch bracket 505, and a roll indicator 513 coupled to target 405. In the depicted embodiment, each of pitch indicator 511 and roll indicator 513 comprise a bubble level suitable to determine a horizontal leveling of the target 405 with respect to their respective rotational orientations (pitch and roll, respectively). Other embodiments may comprise other indicators without deviating from the teachings disclosed herein. Bubble level indicators are advantageously utilized because they are capable of providing a true horizontal level measurement irrespective of the conditions of the resting surface upon which target assembly 103 rests. By way of example, and not limitation, a slanted floor will not have any impact on the accuracy of the measurements of bubble level embodiments of either pitch indicator 511 or roll indicator 513. Other configurations may utilize a different sort of indicator utilizing different technology without deviating from the teachings disclosed herein. By way of example, and not limitation, the pitch indicator and/or roll indicator may utilize a laser level, tape measure, weight balance, sonic detection, range finder, or any other measurement component known to one of ordinary skill in the art without deviating from the teachings disclosed herein.

Figure 6:
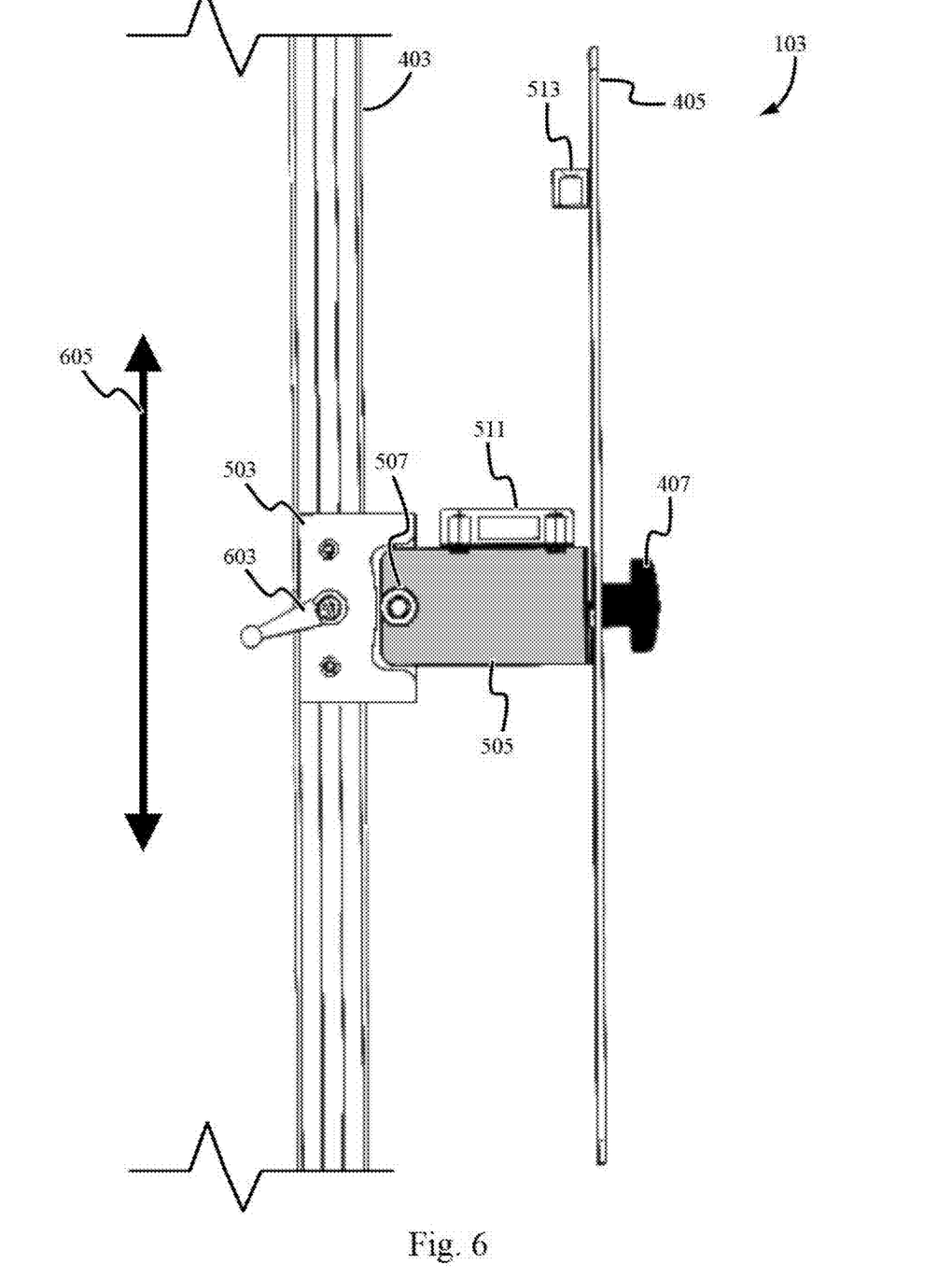
FIG. 6 is a close-up illustration of some elements of the target assembly of FIG. 4.

Some vehicular sensors have a vertical detection function that requires a calibration target to be placed at different levels vertically with respect to the vehicle. FIG. 6 is a close-up view of portions of target assembly 103, with particular focus on the coupling bracket 503. Coupling bracket 503 is shown to additionally comprise a locking mechanism 603. Locking mechanism 603 is operable to lock in place the vertical position of coupling bracket 503 with respect to the length of upright member 403 in direction 605. Because coupling bracket 503 is itself coupled to pitch bracket 505, and target 405 is mounted to pitch bracket 505, the vertical position of coupling bracket 503 ultimately dictates the vertical position of target 405. Locking mechanism 603 prevents unwanted movement of coupling bracket 503 during a calibration process. In the depicted embodiment, locking mechanism 603 comprises a crank arm to tighten a bolt against upright member 403, but other embodiments may comprise additional configurations without deviating from the teachings disclosed herein. In the depicted embodiment, coupling bracket 503 may be freely positioned along direction 605 when locking mechanism 603 is loosened. Other embodiments may comprise other configurations-such as indentations to control the positioning into discrete values, or a ratchet mechanism to control the position by discrete displacements-without deviating from the teachings disclosed herein. In some embodiments, upright member 403 may comprise measurement indicators printed thereon, such as ruler ticks or stripes having predetermined placement, in order to assist a user with the vertical placement of coupling bracket 503. Other embodiments may utilize measurement tools, such as rulers, rods or bands of predetermined lengths, tape measures, or range finders in order to assist a user with vertical placement without deviating from the teachings disclosed herein.

Figure 7:
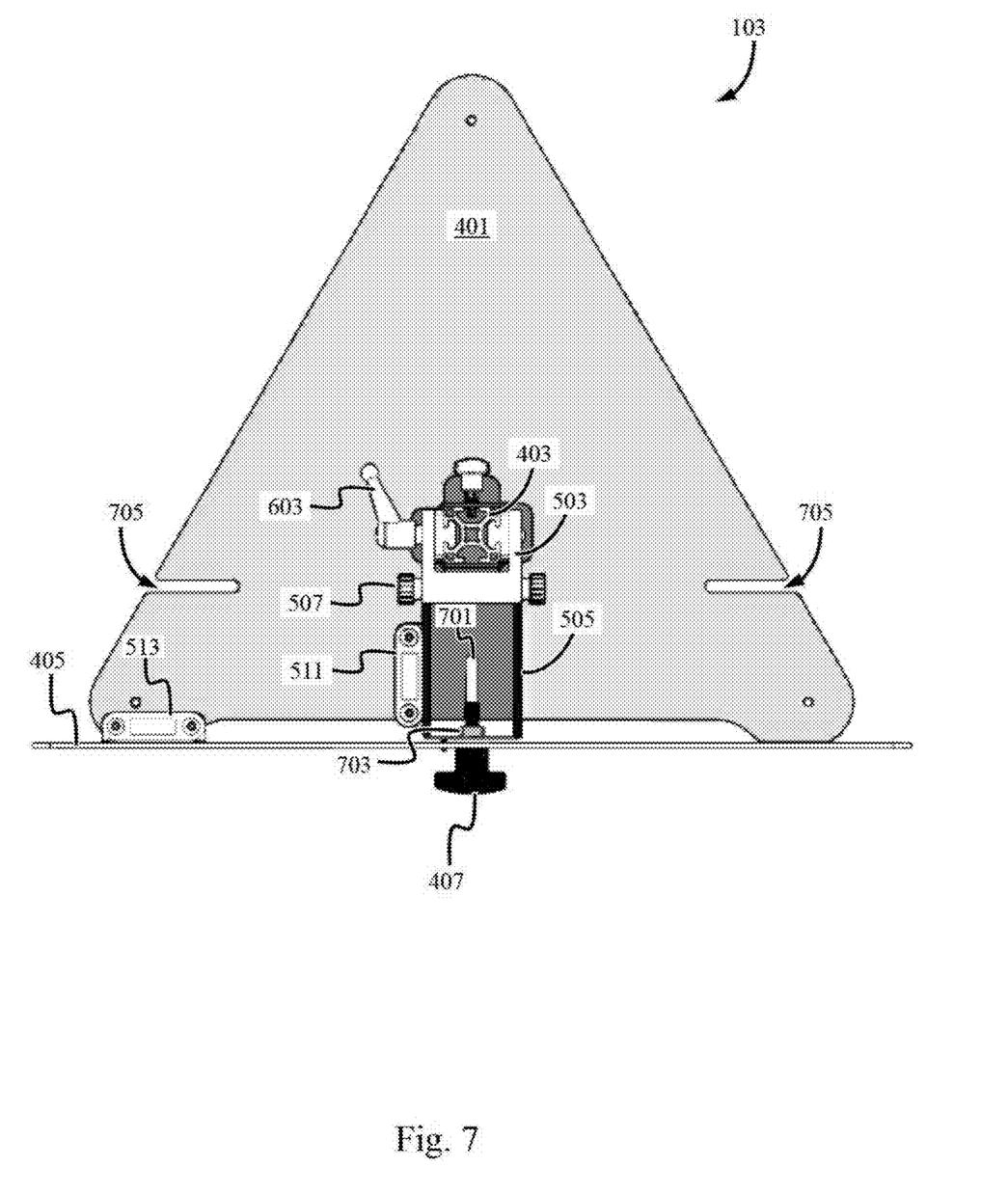
FIG. 7 is a top-down illustration of the target assembly of FIG. 4.

Additional features of target assembly 103 are observable in FIG. 7, which provides a top-down view thereof. In particular it is noted that pitch bracket 505 defines a cavity therein, into which a pin 701 is received when roll knob 407 is used to secure target 405 to pitch bracket 505. In the depicted embodiment, pin 701 is an extension of roll knob 407, and comprises a screw-threaded pin that is configured to interact with a target mount 703 of pitch bracket 505. In this embodiment, target mount 703 comprises a threaded nut configured to interact with pin 701, but other embodiments may comprise other configurations of pin and mount without deviating from the teachings disclosed herein. In the depicted embodiment, the threading of pin 701 and target mount 703 advantageously permit a user to readily adjust the tension of roll knob 407 by hand, which both permits user control over the security of the coupling of target 405 to pitch bracket 505 and also permits reliable user access to control the roll orientation of target 405. Also visible in FIG. 7 is a number of alignment indicators 705 which are configured to assist a user with visible alignment of target assembly 103 with the correct placement for a sensor calibration process on a mat (such as mat 105, see FIG. 1, FIG. 2, FIG. 3). In the depicted embodiment, the alignment indicators 705 comprise a viewing notch in base member 401. A viewing notch configuration of alignment indicators 705 makes for a quick and reliable visually alignment with markings on an associated mat, such as placement indicators 305 (see FIG. 3). Other embodiments may comprise different or additional alignment indicators without deviating from the teachings disclosed herein. By way of example, and not limitation, other embodiments may have alignment indicators comprised of colorations, patterns, printed markings, reticles, perforations, reflections, or any other visual indicator known to one of ordinary skill without deviating from the teachings disclosed herein.

In the depicted embodiment, base member 401 comprises a triangular arrangement, but other embodiments may comprise other configurations without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A sensor calibration assembly comprising:
  a base member;
  an upright member extending from the base member;
  a coupling bracket coupled to the upright member, the coupling bracket adjustably positionable along the length of the upright member;
  a pitch bracket coupled to the coupling bracket, the pitch bracket comprising a target mount and a hinge;
  a target detachably coupled to the target mount; and
  a roll knob controlling a roll motion of the target when the target is coupled to the target mount,
  wherein the hinge controls a pitch motion of the target mount with respect to the upright member,
  wherein the base member further comprises an alignment indicator to align with an external marking aiding in placement of the target assembly in relation to a subject vehicle for sensor calibration, the alignment indicator comprising a viewing notch.

2. The sensor calibration assembly of claim 1, wherein the coupling bracket further comprises a locking mechanism to secure the position of the coupling bracket with respect to the length of the upright member.

3. The sensor calibration assembly of claim 1, further comprising a pitch indicator configured to indicate the pitch of the target when coupled to the target mount in relation to the upright member.

4. The sensor calibration assembly of claim 3, wherein the pitch indicator is a bubble level coupled to the pitch bracket.

5. The sensor calibration assembly of claim 1, further comprising a roll indicator configured to indicate the roll of the target when coupled to the target mount in relation to the upright member.

6. The sensor calibration assembly of claim 5, wherein the roll indicator is a bubble level coupled to the target.

7. The sensor calibration assembly of claim 1, wherein the base member further comprises an alignment indicator configured to align with a marking of a ground mat to aid in placement of the base member for a sensor calibration.

8. A sensor calibration apparatus comprising:
  a mat having a first marking thereon indicating a first specified position of the mat in relation to a subject vehicle during a calibration of a sensor of the subject vehicle; and
  a target assembly having
    a base member,
    an upright member extending from the base member,
    a coupling bracket coupled to the upright member and adjustably positionable along the length of the upright member,
    a pitch bracket coupled to the coupling bracket comprising a target mount and a hinge,
    a target detachably coupled to the target mount, and a roll knob controlling a roll motion of the target when the target is coupled to the target mount, wherein the mat additionally comprises a second marking thereon indicating a second specified placement of the target assembly in relation to the subject vehicle during a sensor calibration, wherein the hinge provides a degree of pitch motion to the target mount with respect to the upright member, and wherein the base member further comprises an alignment indicator to align with an external marking aiding in placement of the target assembly in relation to a subject vehicle for sensor calibration, the alignment indicator comprising a viewing notch.

9. The sensor calibration apparatus of claim 8, further comprising a pitch indicator configured to indicate the pitch of the target when coupled to the target mount in relation to the upright member.

10. The sensor calibration apparatus of claim 9, wherein the pitch indicator is a bubble level coupled to the pitch bracket.

11. The sensor calibration apparatus of claim 8, further comprising a roll indicator configured to indicate the roll of the target when coupled to the target mount in relation to the upright member.

12. The sensor calibration apparatus of claim 11, wherein the roll indicator is a bubble level coupled to the target.

13. The sensor calibration apparatus of claim 11, further comprising a pitch indicator configured to indicate the pitch of the target when coupled to the target mount in relation to the upright member.

\* \* \* \* \*